United States Patent [19]

Angerer et al.

[11] 4,128,453
[45] Dec. 5, 1978

[54] PROCESS AND APPARATUS FOR REMOVING EVAPORABLE COMPONENTS FROM POLYAMIDE MELTS

[75] Inventors: Dieter Angerer, Grosskrotzenburg; Peter Freund, Bad Vilbel; Werner Hansel, Karben; Fritz Wilhelm, Offenbach am Main, all of Fed. Rep. of Germany

[73] Assignee: Zimmer Aktiengesellschaft, Fed. Rep. of Germany

[21] Appl. No.: 643,385

[22] Filed: Dec. 22, 1975

[30] Foreign Application Priority Data
Dec. 31, 1974 [DE] Fed. Rep. of Germany ....... 2461901

[51] Int. Cl.² ............................................. B01D 1/14
[52] U.S. Cl. ................................ 159/16 S; 159/6 W; 159/DIG. 10; 528/500; 159/13 R
[58] Field of Search ............... 159/6, 16, 46, DIG. 10; 528/499, 520, 502

[56] References Cited
U.S. PATENT DOCUMENTS

| 1,295,259 | 2/1919 | Beebee | 159/16 R |
| 2,606,820 | 8/1952 | Harms | 159/16 R |
| 3,122,528 | 2/1964 | Hanesworth, Jr. | 528/502 |
| 3,533,829 | 10/1970 | Quanquin | 159/16 R |
| 3,743,539 | 7/1973 | Kroyer et al. | 159/16 R |

*Primary Examiner*—Norman Yudkoff
*Attorney, Agent, or Firm*—Alegretti, Newitt, Witcoff & McAndrews

[57] ABSTRACT

An apparatus and process for removing undesired monomers and oligomers from polyamide melt at subatmospheric pressure by passing steam through the melt to absorb the undesired components and carry them away. Various constructions are disclosed for vigorously intermixing the gas with the melt in which the gas is passed through a foraminous surface over which a thin film of melt flows, and a rotating agitator, spaced less than 50 mm from the surface, mixes the gas with the melt film. In a preferred form of the invention the rotating shaft comprising the agitator carries screw threads and serves as a conveyor for discharging treated melt from the pressure vessel in which the process is carried out.

3 Claims, 8 Drawing Figures

PROCESS AND APPARATUS FOR REMOVING EVAPORABLE COMPONENTS FROM POLYAMIDE MELTS

BACKGROUND OF THE INVENTION

This invention relates to a process for removing evaporable components from polyamide melts at subatmospheric pressure and under steady agitation while simultaneously conducting a gaseous medium through the melt.

Polyamide-6, just after its production, contains a number of components which if they remain in the products manufactured from it lead to difficulties in the further processing and to a reduction in the quality of the end product. Here the content in monomers and oligomers plays a special role, whicy, by reason of an equilibrium reaction, runs to about 8 to 11% by weight. For most purposes of use of polyamide-6, it is required that the content of monomers and oligomers (also designated as extract content) lie below 2% by weight.

In spinning threads and fibers of polyamide-6 it is possible either to proceed from chips or to spin the polymerized melt directly. In the circuitous process using chips, the product, by reason of aqueous chip extraction and drying, has a desired, low extract content below 2%, but the expenditure for achieving this goal is very great both in respect to the apparatus needed and the energy requirements. Process steps include the production of chips, their extraction, drying and remelting. Therefore, additional devices are required for the production of the chips, extraction apparatus units, driers and extruders. The heat content of the melt is lost through the cooling in the chip production. Both in the drying and in the remelting of the chips energy is required.

In the direct spinning of polyamide-6, the expenditure on the installation as well as the energy requirement is appreciably less, but the spun product contains an extract content, depending on the procedure, of about 3% and above, too high for today's demands. In direct spinning the melt coming from the polymerization reactors is demonomerized in vacuum stages, in which the extract content recedes from ca. 10% by weight to ca. 3% by weight. In such vacuum stages generally the "wet wall" principle is employed, i.e., the melt is dispensed over the circumference of a vertical cylindrical container under high vacuum, flows in a thin layer down the container walls and collects in the container sump. There a large part of the monomers and oligomers evaporates. The effectiveness of the process is determined primarily by the layer thickness of the film, by the viscosity of the polymer, by the run-off length or residence time, the degree of the vacuum and the size of the sump. The layer thickness of the polyamide film should be as small as possible. However, a lower limit is dictated by the necessity of uniformly wetting the container wall, as well as by the size of the container and the desired maximum throughput. With known processes and apparatus of this type an extract content of ca. 3% by weight can be achieved.

THE PRIOR ART

It is already known to reduce the extract content of the melt to values below 2% by weight by injecting superheated steam or inert gas, i.e., by reducing the partial pressures of the volatile components. German published application AS No. 1,270,286 discloses a process in which the superheated steam is introduced through holes in the wall of the reaction vessel into the downwardly-flowing melt film. It is very difficult, however, to achieve uniform treatment of the entire melt with gas or steam. It was found that upon discharging the steam or inert gas the individual gas bubbles combine to form larger gas bubbles, which give rise to regular gas channels. This counteracts the desired fine distribution and optimal demonomerization. At least, however, this process provides for considerably better use of the gaseous medium in bringing about the demonomerization.

It is also known that the intensity of the material exchange between a polyamide melt and an inert gas conducted through it in finely divided form can be intensified by agitation. However, it was not appreciated that merely turning over the melt permeated with gas bubbles at an arbitrary not-further-defined place leads only to a slight improvement of the exchange.

Finally, German published application AS No. 1,660,666 teaches the practice of introducing a vapor favoring the extraction through a hollow shaft into the polyamide melt. Here, however, the mixing of the vapor bubbles with the polyamide melt under the influence of the shearing effect of the agitating device takes place only in the immediate region of the shaft. A further disadvantage of this process is that the agitator is difficult to disassemble and to clean, and that the injecting of the steam through the moving shaft is a costly construction to build.

THE INVENTION

The invention, therefore, is concerned with the problem of providing a process of the type described in which the interaction between polyamide melt and gaseous medium, and thereby the substance interchange, is intensified to a high degree, without a disproportionately high constructional expenditure for the introduction of the gas into the melt.

The solution to the problem posed is achieved according to the present invention, by carrying out the agitating movement in the immediate vicinity of at least one fixed surface covered by a layer of the melt, through which, by means of a large number of openings, the gaseous medium is conducted.

More specifically, the agitating device strips the gas and/or vapor bubbles entering into the melt virtually from the emergence surface of the bubbles. To achieve this, the gap between the agitating device and the emergence surface for the bubbles is so narrow that the bubbles are stirred up and distributed in the polymer. The gap width required is, as a rule, less than 50 mm, preferably less than 20 mm. In the extreme case the agitating device can be constructed as a scraper in direct contact with the bubble emergence surface.

The solution according to the invention provides the following advantages: through the stationary arrangement of the emergence surface for the gaseous medium no gastight rotary connection is necessary in the gas feed line of the device required for the process. The constructional expenditure therefore can be kept very low because sealing problems do not arise. The combination of small gas bubbles into larger gas bubbles and the formation of gas channels within the polyamide melt are suppressed or entirely avoided. Thus, for any given throughput of gaseous medium through the polyamide melt a maximum intensity of surface interchange is effected. The gaseous medium conducted through the melt absorbs, therefore, a maximum quantity of monomer and oligomer vapors, thus eliminating the need for a great excess of vapors or gases.

An apparatus for practicing process consists of an evacuable vessel with a feed device for the polyamide melt, a feed line for bringing the gaseous medium to a perforated surface, a discharge conduit for the gaseous medium enriched with the evaporable components and an agitating device for the polyamide melt. This apparatus is unique in that the active parts of the agitating device are disposed in the immediate vicinity of the perforated surface. The perforated surface may be a separate element made from sintered material, or the wall of the vessel may constitute a sintered plate. The perforated surface may also be formed by nozzle bores or holes arranged in the container wall itself or in a separate part installed in the container wall. Further modifications and advantageous developments of the invention are set forth in the detailed description.

DETAILED DESCRIPTION

Specific examples of devices for the execution of the process of the invention and their functioning are explained in detail in the following specification with the aid of FIGS. 1 to 8, which show schematically axial sections through the vessel and its associated parts.

Figure 1:
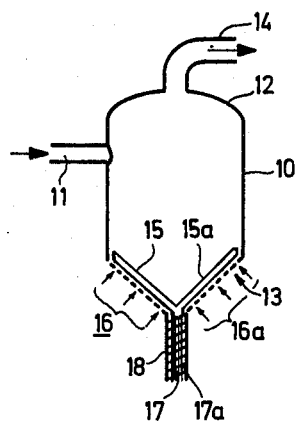

In FIG. 1 an evacuable vessel or container 10 is provided with a feed conduit 11 for the polyamide melt. The container consists of an upper cylindrical shell closed off at the top by a cover 12 and terminates at the bottom in a conical part 13. In the cover 12 is a discharge conduit 14 for the gaseous medium enriched with the evaporable components, which leads to an apparatus for generating a subpressure. The feed conduit 11 for the polyamide melt is symbolically represented as a lateral pipe. It should be understood that in the interior of the container, for the purpose of providing a uniform distribution of the melt there can be arranged additional devices, such as an annular nozzle, an overflow trough, a distributor spray head, etc. In the lower part of the container 10 there is an agitating device 15, which sweeps a perforated surface 16a having a large number of openings 16 through which the gaseous medium passes. The principle of the above-described construction is utilized in all the modifications shown in FIGS. 1 to 8, so that in describing FIGS. 2 to 8 we shall dispense with reiterations. The differences shown in the figures relate essentially to the development of the zone in which the openings 16 stand in interaction with the agitating device 15.

In the apparatus of FIG. 1, the conical bottom 13 is provided on its entire surface with a large number of openings 16, which together form a perforated surface 16a. An agitating device 15, having agitating blades 15a, of which two are represented in the drawing, run parallel to the genetrix lines of the conical bottom 13. Between the lower edge of each agitating blade 15a and the perforated surface 16a there is a gap of the above-indicated width. The length of the agitating blades 15a is equal to the sloping wall of the conical bottom 13 over which the openings 16 are distributed. A shell (not shown in the drawing) is disposed beneath the openings 16, which together with the bottom 13 forms a feed space for the gaseous medium to be discharged through the openings into the polyamide melt. The agitating device 15 is secured to a drive shaft 17, which is provided with external threads 17a, and is rotatably disposed in a tube 18 mounted on the container bottom 13 to provide a discharge worm. These movable parts are coaxially mounted and, therefore, can be made and assembled without special expenditure.

Figure 2:
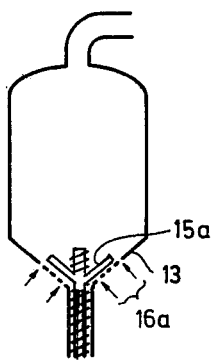
Figure 3:
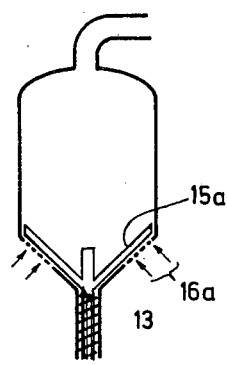

The apparatus according to FIG. 2 differs essentially from that of FIG. 1 in that the perforated surface 16a is restricted to the inner part of the conical bottom 13, and the length of the agitating blades 15a is correspondingly reduced. Conversely, in the device according to FIG. 3, the perforated suface 16a lies in the outer or border zone of the conical bottom 13, and the agitating blades 15a again have a length which corresponds to the length shown in FIG. 1. With the constructions shown in FIGS. 2 and 3, it is possible to attune the shearing velocity between agitating blades 15a and perforated surface 16a to the turning speed of the drive shaft 17 and thereby control the conveying effect of the worm courses 17a. Furthermore, by varying the position of the perforated surface 16a it is possible to influence the residence time of the melt between the treatment with the gaseous medium and discharge from the container.

Figure 4:
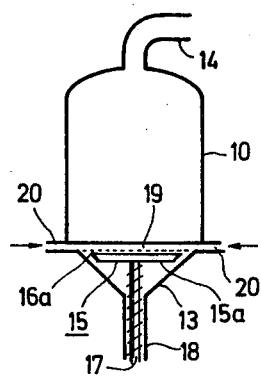

In the apparatus according to FIG. 4 the conical bottom 13 of the container 10 is constructed as a closed surface. The perforated plate 16a is disposed at the underside of several radially-arranged channel-type hollow bodies 19, the spaces therebetween permitting the melt to flow on to the perforated plate. The ends of the radially-disposed hollow bodies 19 extend outwardly in the form of tubular feed lines 20 for supplying the gaseous medium. Underneath the star-shaped hollow bodies 19 and coaxially to their center is the agitating device 15, which in the present case is likewise constructed in star form, so that the individual agitating blades 15a point outward, their length corresponding to the dimensions of the hollow bodies 19 and to the outer diameter of the perforated surface 16a. Also in this case the agitating device 15 is structurally united with a drive shaft 17 having threads or worm courses 17a, to provide a discharge worm. In this device an especially intensive intermixing of melt and gaseous medium is achieved.

Figure 5:
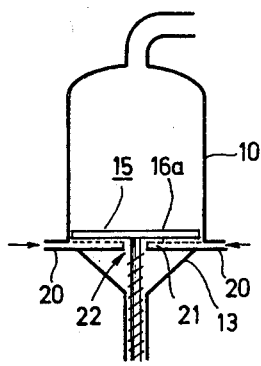

In the apparatus according to FIG. 5 the cooperating elements shown in FIG. 4 are reversed. In place of the star-shaped hollow body 19 there is an annular hollow body 21, which with the exception of a central opening 22, fills the cross section of the container 10. The securing of the hollow body 21 to the container wall as well as the feed of the gaseous medium are accomplished in the present case by means of tubular feed lines 20. The perforated surface 16a is on the upper side of the hollow body 21, which is swept by the agitating device 15 analogously to FIG. 4. The dimensioning of the perforated surface 16a and the agitating device 15 follows the construction of FIG. 4. In both cases (FIGS. 4 and 5) the spacing between the perforated surface 16a and the agitating device 15 correspond to the dimensioning guidelines mentioned above.

Figure 6:
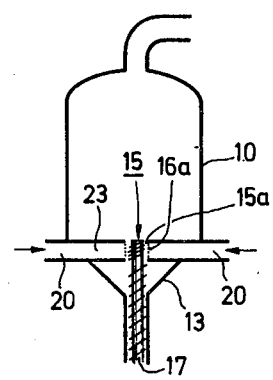

In the apparatus according to FIG. 6 the bottom 13 of the container 10 also forms a closed surface. The perforated surface 16a is formed in this case by the cylindrical inner surface of an annular hollow body 23, which, analogously to FIG. 5, is connected by tubular feed lines 20 to the container 10. The annular hollow body 23 has a greater thickness than the corresponding part in FIG. 5, so that there is sufficient space available for the perforated surface 16a. Inside this cylindrically formed surface there is located an agitating device 15 having a cylindrical shaft 17 with screw-like agitating blades 15a set on it. The gap between the agitating blades 15a and the perforated surface 16a corresponds in width to the considerations previously specified. The agitating device 15 also includes a discharge worm consisting of drive shaft 17 and worm courses 17a.

Figure 7:
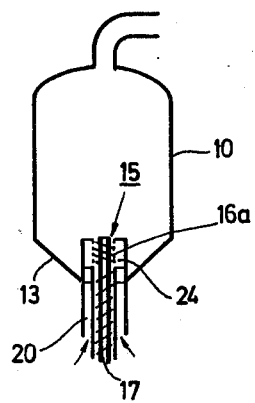

A further modification in the arrangement of the perforated surface 16a is shown in FIG. 7. There this surface is part of a hollow cylinder 24 which extends vertically from below into the container 10 and reaches upward about as far as the conical bottom 13. The inner wall of the hollow cylinder is provided with the openings which form the perforated surface 16a. The agitating device 15 is substantially identical with that shown in FIG. 6.

Figure 8:
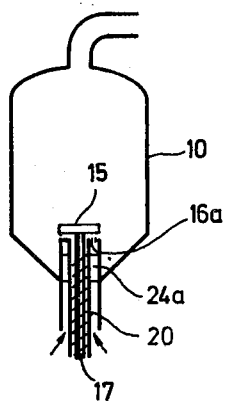

FIG. 8 shows a modification of the device of FIG. 7. The hollow cylinder 24a disclosed there extends in an analogous manner into the interior of the container 10, but in the present case the face or upper side of the hollow cylinder 24a is constructed as a perforated surface 16a. The agitating device 15 is arranged in the form of one or more radial crosspieces on the upper end of the drive shaft 17 having worm courses 17a, similar to the shaft in FIG. 5. The gap width between the perforated surface 16a and the agitating device 15 follows the rule laid down above. In the apparatus of FIGS. 7 and 8 the gaseous medium used for the extraction is introduced in the direction of the arrows into the annular space of the hollow cylinders 24 and 24a, through which the gas is conducted up to the perforated surfaces 16a. The apparatus of FIGS. 7 and 8 is characterized by an especially simple construction easy to clean, since the hollow cylinders 24 and 24a together with the cooperating agitating devices 15 are easily removed from below the container 10. These constructions can also be installed subsequently in containers of differing size.

It is to be understood that the embodiment of the invention which has been described is merely illustrative of one application of the principles of the invention. Numerous modifications may be made to the disclosed embodiment without departing from the true spirit and scope of the invention.

What is claimed is:

1. Apparatus for removing evaporable components from polyamide melts at subatmospheric pressure and under constant agitation while simultaneously conducting a gaseous medium through the melt, comprising an evacuable container having a perforated surface disposed in the lower part thereof, means for feeding the polyamide melt into said container and over said surface, a feed line for conducting the gaseous medium through said perforated surface into the melt, a discharge conduit connecting to said container for removing the gaseous medium enriched with the evaporable components, an agitating device for the polyamide melt, wherein the active parts of the agitating device comprise agitating blades arranged to move over the surface parallel to it at a slightly spaced distance from said perforated surface to enhance formation of gas bubbles in the melt and simultaneously enhance intermixing of gas in the melt, and a discharge worm for the polyamide melt which is structurally united with the agitating device.

2. Apparatus according to claim 1, characterized in that the axes of said agitating device and discharge worm are disposed perpendicularly.

3. Apparatus according to claim 1, characterized in that the spacing between the agitating device and the perforated surface is less than 50 mm.

* * * * *